United States Patent [19]

Margis

[11] Patent Number: 5,568,484
[45] Date of Patent: Oct. 22, 1996

[54] TELECOMMUNICATIONS SYSTEM AND METHOD FOR USE ON COMMERCIAL AIRCRAFT AND OTHER VEHICLES

[75] Inventor: Paul A. Margis, Irvine, Calif.

[73] Assignee: Matsushita Avionics Systems Corporation, Irvine, Calif.

[21] Appl. No.: 363,228

[22] Filed: Dec. 22, 1994

[51] Int. Cl.⁶ .......................... H04J 3/16; H04L 12/433; H04N 7/08
[52] U.S. Cl. .......................... 370/85.5; 370/85.14; 348/8; 348/837; 455/6.3
[58] Field of Search ................... 370/58.1, 58.2, 370/58.3, 60, 61, 79, 85.1, 85.4, 85.5, 85.12, 85.13, 85.14, 85.15, 94.1, 94.3; 379/67, 88, 89, 93, 94, 101; 348/8, 10, 13, 14, 15, 836, 837; 455/2, 3.1, 3.2, 4.1, 4.2, 5.1, 6.3; 340/825.05, 825.06, 825.08, 825.5, 825.51, 825.07, 825.22, 825.28, 825.29; 364/424.01, 424.03, 424.04, 424.05, 424.1; 395/200, 325

[56] References Cited

U.S. PATENT DOCUMENTS

| | | | |
|---|---|---|---|
| 4,774,514 | 9/1988 | Hildebrandt et al. | 340/825.06 |
| 4,866,515 | 9/1989 | Tagawa et al. | 348/15 |
| 4,866,704 | 9/1989 | Bergman | 370/85.5 |
| 4,897,714 | 1/1990 | Ichise et al. | 348/8 |
| 4,958,381 | 9/1990 | Toyoshima | 455/4.1 |
| 5,001,642 | 3/1991 | Botzenhardt et al. | 364/431.12 |
| 5,119,104 | 6/1992 | Heller | 342/450 |
| 5,142,550 | 8/1992 | Tymes | 375/206 |
| 5,151,896 | 9/1992 | Bowman et al. | 370/85.13 |
| 5,168,272 | 12/1992 | Akashi et al. | 395/200.18 |
| 5,195,183 | 3/1993 | Miller et al. | 395/200.2 |
| 5,237,659 | 8/1993 | Takats | 370/85.5 |
| 5,280,498 | 1/1994 | Tymes et al. | 375/200 |
| 5,283,868 | 2/1994 | Baker et al. | 340/825.08 |
| 5,289,272 | 2/1994 | Rabowsky et al. | 348/8 |
| 5,289,378 | 2/1994 | Miller et al. | 364/424.04 |
| 5,301,185 | 4/1994 | Cherry | 370/16.1 |
| 5,305,308 | 4/1994 | English et al. | 370/32.1 |
| 5,305,321 | 4/1994 | Crayford | 370/94.1 |
| 5,311,515 | 5/1994 | Henderson et al. | 370/85.5 |
| 5,383,178 | 1/1995 | Unverrich | 370/85.5 |
| 5,410,754 | 4/1995 | Klotzbach et al. | 370/85.13 |

Primary Examiner—Alpus H. Hsu
Attorney, Agent, or Firm—Lyon & Lyon

[57] ABSTRACT

A telecommunications system and method for use on aircraft and other vehicles. One or more token ring local area networks are utilized to provide a telecommunications link between a plurality of telephone units and a telephone data signal router circuit which, in turn, is coupled to a CEPT E1 bus and provides telecommunications data signals over the CEPT E1 bus to a cabin telecommunications unit.

4 Claims, 5 Drawing Sheets

5,568,484

TELECOMMUNICATIONS SYSTEM AND METHOD FOR USE ON COMMERCIAL AIRCRAFT AND OTHER VEHICLES

FIELD OF THE INVENTION

The field of the present invention is telecommunications systems and, more particularly, telecommunications systems for use on aircraft and other vehicles.

Recently, substantial attention has been directed to the development of telecommunications systems for use on aircraft and other vehicles. These systems generally comprise a plurality of arm rest telephone units (ARTs) or telephone handsets; a plurality of seat telephone boxes (STBs); a plurality of zone telephone boxes (ZTBs); a cabin telecommunications unit (CTU); and a satellite data communications unit (SATCOM). Generally, the arm rest telephone units (ARTs), seat telephone boxes (STBs), zone telephone boxes (ZTBs), cabin telecommunications unit (CTU) and satellite data communications unit (SATCOM) are electronically coupled to one another via a standard telecommunications bus which employs some type of time domain multiplexing protocol. For example, in a conventional aircraft telecommunications system a subset of the telephone handsets may be coupled electronically to each of the seat telephone boxes (STBs), and subsets of the seat telephone boxes (STBs) may be connected via a CEPT E1 bus to a telephone communications card in each of the zone telephone boxes (ZTBs). Finally, the zone telephone boxes may be connected via a CEPT E1 bus to the cabin telecommunications unit (CTU), and the cabin telecommunications unit, in turn, may be coupled via a CEPT E1 bus to the satellite data communications unit (SATCOM). The operation of an aircraft telecommunication system, such as that described above and illustrated in FIG. 1, is well known in the art and, thus, is not described in detail here.

Those skilled in the art will appreciate that, while conventional aircraft telecommunications systems such as that described above are used on numerous aircraft, it is quite difficult to integrate those systems with the passenger entertainment systems and cabin management systems which are currently being offered on some aircraft. Moreover, using conventional telecommunications systems it is presently common, if not necessary, where both a telecommunications system and a passenger entertainment system are to be installed on an aircraft, to utilize two separate data communications systems (one dedicated to telecommunications signals and one dedicated to entertainment signals) on the aircraft. One reason for this is that in conventional aircraft telecommunications systems connectivity between system components is provided solely by CEPT E1 standard or equivalent buses. Because it is highly desirable to minimize the weight of all systems which are to be installed on an aircraft, those skilled in the art will recognize that a need exists for a telecommunications system which can be readily integrated with other systems, such as passenger entertainment systems, already installed on the aircraft. Moreover, a telecommunications system, which could be readily integrated with an existing passenger entertainment system, and which could utilize much of the same wiring used by an existing passenger entertainment system, would be quite desirable.

SUMMARY OF THE INVENTION

The present invention is directed to a telecommunication system and method for use on aircraft and other vehicles which may be readily integrated with other systems, such as passenger entertainment systems, already installed on those aircraft or vehicles. Moreover, the present invention is directed to an innovative system and method for distributing telecommunications signals within an aircraft or other vehicle.

In one preferred form, an aircraft telecommunications system in accordance with the present invention comprises a plurality of telephone units, for example, arm rest telephone units (ARTs); a plurality of first telephone cards each disposed in, for example, a seat electronics box (SEB) and electronically coupled to a subset of the telephone units; a second telephone card disposed in, for example, a passenger entertainment system control unit (PESC); a cabin telecommunications unit (CTU); at least one token ring local area network (LAN) providing a connectivity between the second telephone card and the plurality of first telephone cards; and a CEPT E1 bus providing a connectivity between the second telephone card and the cabin telecommunications unit (CTU).

Those skilled in the art will recognize that at least some passenger entertainment systems now on the market, for example, the System 2000E™ manufactured by Matsushita Avionics Systems of Irvine, Calif., utilize one or more token ring local area networks (LANs) to provide data communications between a passenger entertainment system controller (PESC) and a plurality of seat electronics boxes (SEBs). Thus, a system in accordance with the present invention may be readily integrated with those passenger entertainment systems and may use much of the same wiring utilized by those entertainment systems.

Accordingly, it is an object of the present invention to provide a telecommunications system which can be readily integrated with an existing passenger entertainment system or cabin management system on an aircraft.

It is another object of the present invention to provide an improved system and method for distributing telecommunications signals within an aircraft or other vehicle.

It is still another object of the present invention to provide a telecommunications system and method for use on aircraft and other vehicles, wherein at least one general purpose local area network (LAN), for example, a token ring network, is used to carry telecommunications voice data from a plurality of passenger seat locations to and from a telecommunications routing circuit which, in turn, provides a communications link to a cabin telecommunications unit.

It is still another object of the present invention to provide a telecommunications system for use on aircraft and other vehicles, wherein it is not necessary to provide a telecommunications connectivity between a plurality of seat locations using a CEPT E1 bus.

DETAILED DESCRIPTION OF THE PREFERRED EMBODIMENTS

Figure 1:
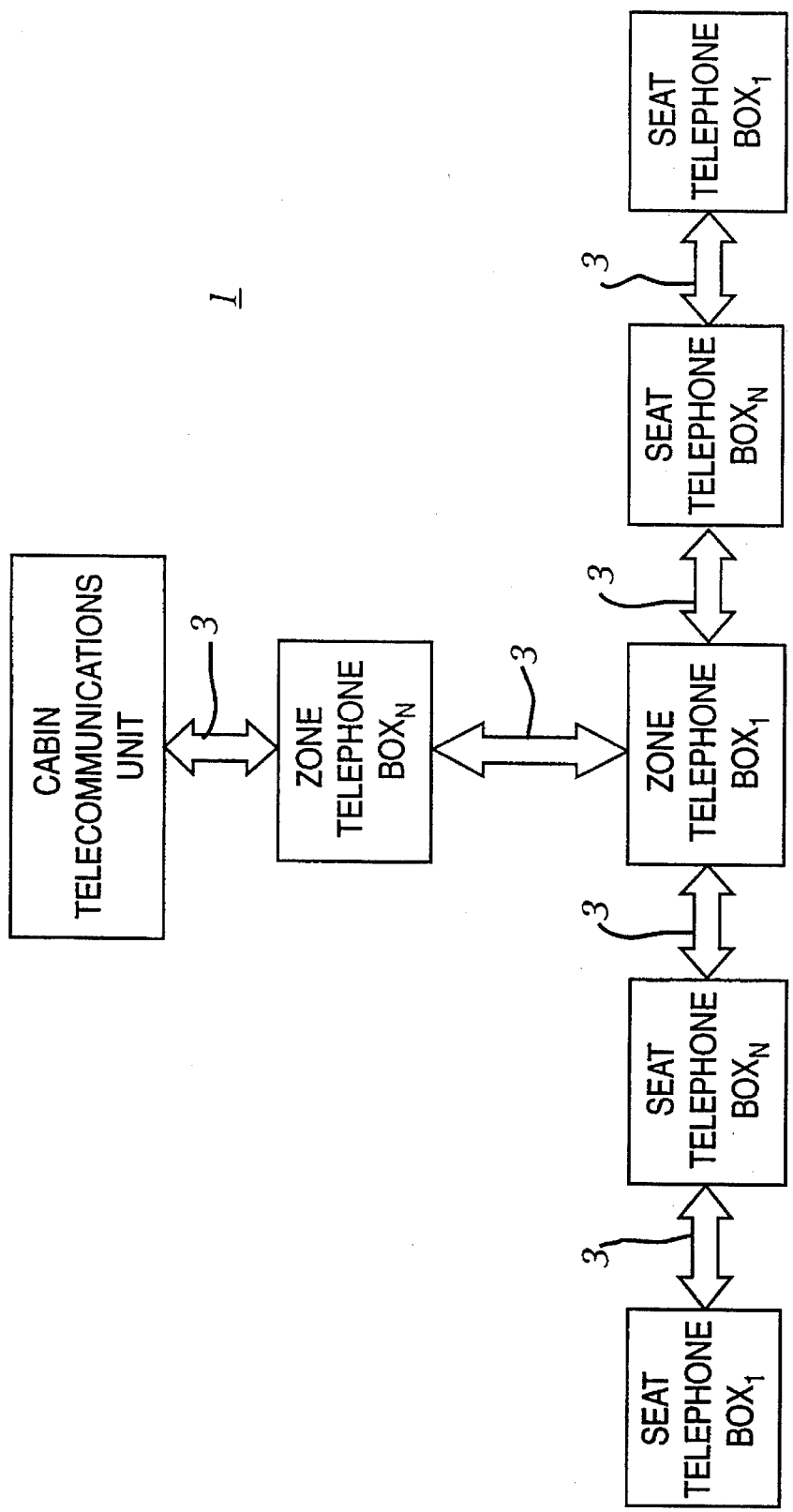
FIG. 1 is a block diagram illustrating a prior art telecommunications system for use on aircraft and other vehicles.

In an effort to highlight various embodiments and innovative aspects of the present invention, a number of subheadings are provided in the following discussion. In addition, where a given structure appears in several drawings, that structure is labeled using the same reference numeral in each drawing.

Telecommunications System Overview

Turning now to the drawings, FIG. 1 comprises a block diagram illustrating a conventional, prior art, aircraft telecommunications system 1, wherein a plurality of CEPT E1 buses 3 provide a connectivity between virtually all elements of the system.

Figure 2:
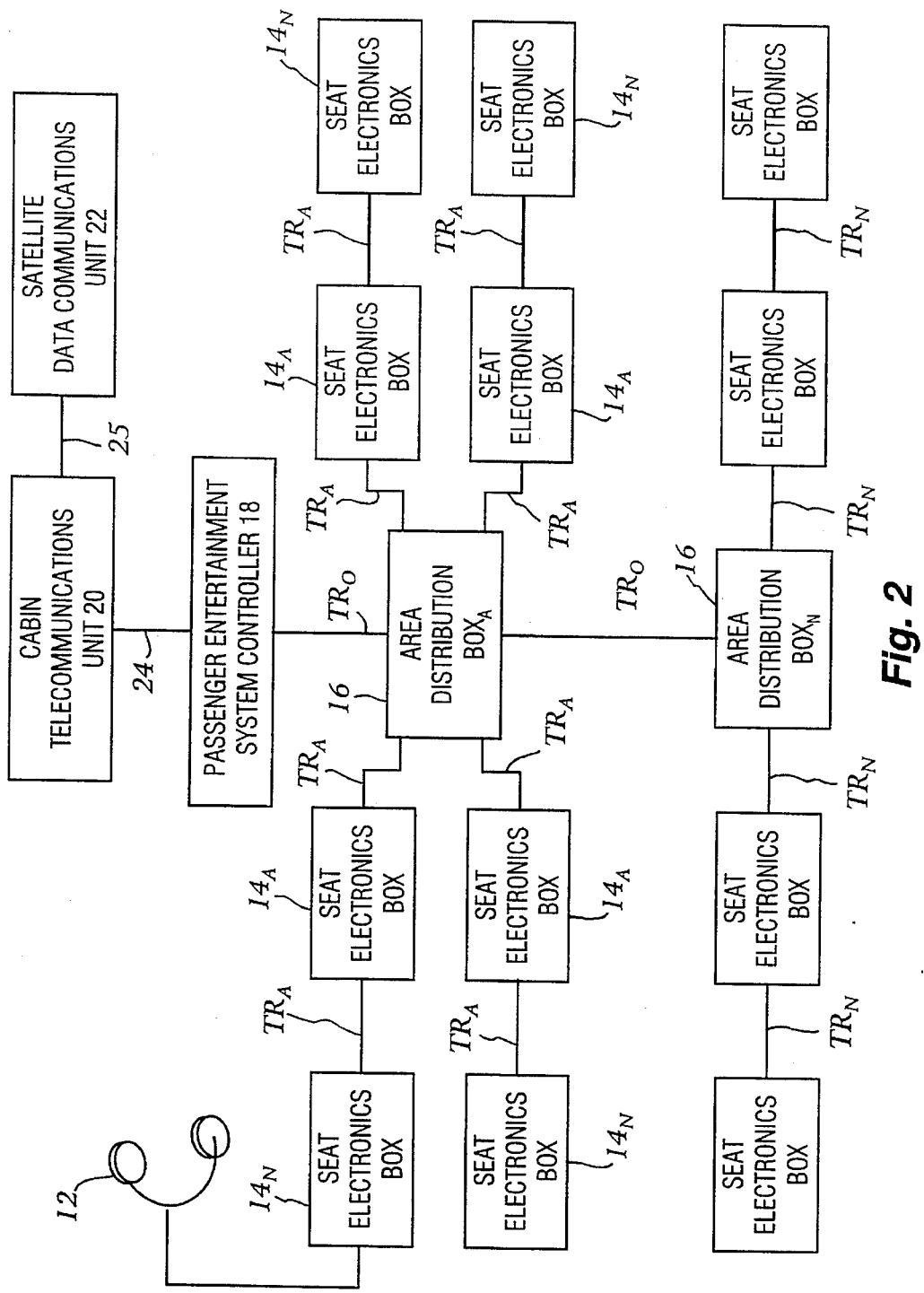
FIG. 2 is a block diagram representing an aircraft telecommunications system in accordance with one preferred form of the present invention.

FIG. 2 comprises a block diagram representing a telecommunications system in accordance with the present invention. As shown in FIG. 2, in one preferred form a telecommunications system 10 in accordance with the present invention may comprise a plurality of arm rest telephone units (ARTs) 12, a plurality of seat electronics box (SEB) telephone subsystems 14, one or more area distribution box (ADB) telephone subsystems 16, a passenger entertainment system controller (PESC) telephone card 18, a cabin telecommunications unit (CTU) 20, a satellite data communications unit (SATCOM) 22; a plurality of token ring local area networks (LANs) $TR_{O-N}$; and a CEPT E1 bus 24.

Each arm rest telephone unit (ART) may comprise, for example, a telephone handset, model number RD-AA6501-XX manufactured and distributed by Matsushita Electronics Industrial Co., Ltd., of Osaka Japan. In a preferred form, three (3) arm rest telephone units (ARTs) 12 are coupled electronically, in a conventional fashion, to each seat electronics box (SEB) telephone subsystem 14.

In a preferred form, a plurality of seat electronics box (SEB) telephone subsystems $14_{A-N}$ each servicing a plurality of passenger seat locations are arranged in one or more daisy chains and are electronically coupled to each of a plurality of area distribution box (ADB) telephone subsystems $16_{A-N}$ via a set of token ring local area networks (LANs) $TR_{A-N}$. More specifically, each area distribution box (ADB) telephone subsystem 16 may have coupled thereto as many as four (4) daisy chains of seat electronics box (SEB) telephone subsystems 14, and all of the seat electronics box (SEB) telephone subsystems 14, which are connected via the daisy chains to a single area distribution box (ADB) telephone subsystem 16, are interconnected via a single token ring local area network (LAN) $TR_{A-N}$. Similarly, each of the area distribution box (ADB) telephone cards $16_{A-N}$ are arranged in a daisy chain and connected to one another and to the passenger entertainment system controller (PESC) telephone card 18 via another token ring local area network (LAN) $TR_O$. The passenger entertainment system controller (PESC) telephone card 18 is coupled to the cabin telecommunications unit (CTU) 20 via a CEPT E1 bus 24, and the cabin telecommunications unit (CTU) 20 is coupled to the satellite data communications unit (SATCOM) 22 via a CEPT E1 bus 25.

The function of a telecommunication system 10 in accordance with the present invention is discussed in some detail below but may be summarized as follows. Once it has been established that a channel is available on the CEPT E1 bus, and the system 10 is ready to commence the transmission of voice data over the various local area networks and the CEPT E1 bus, the analog voice signals, which are provided by an arm rest telephone unit (ART) 12 to a seat electronics box (SEB) telephone subsystem 14, are converted to digital data signals and stored as data packets in a memory 46 (shown in FIG. 3). The data packets, in turn, are transmitted over the token ring local area networks (LANs) to the passenger entertainment system controller (PESC) telephone card 18 and, from there, transmitted over the CEPT E1 bus 24 to the cabin telecommunications unit (CTU) 20. Finally, the digital data packets are reformat:ted in the cabin telecommunications unit (CTU) and forwarded to the satellite data communications unit (SATCOM) 22 in a conventional fashion for transmission from the aircraft.

When telecommunications data is received by the satellite data communications unit (SATCOM) 22, that data is transmitted back through the system 10 in essentially the reverse order of that described above.

In a preferred for m, data communications over the token ring local area networks (LANs) $TR_{O-N}$ meet IEEE 802.5 token ring standards, and the token ring data transmission rate is preferably set at 16 Mbps. Data communications over the CEPT E1 bus 24 preferably meet CCITT standards per documents G.703, Section 6; G.704, Section 2.3; and G.732, Sections 1–7, and the CEPT E1 transmission rate is preferably 2.048 Mbps.

Those skilled in the art will appreciate that at least some passenger entertainment systems now on the market, for example, the System 2000E™ manufactured by Matsushita Avionics Systems of Irvine, Calif., utilize one or more token ring local area networks (LANs) to provide data communications between a passenger entertainment system controller (PESC) and a plurality of seat electronics boxes (SEBs). Thus, a system in accordance with the present invention may be readily integrated with those passenger entertainment systems and may utilize much of the same wiring utilized by those entertainment systems.

SEB Telephone Subsystem

Figure 3:
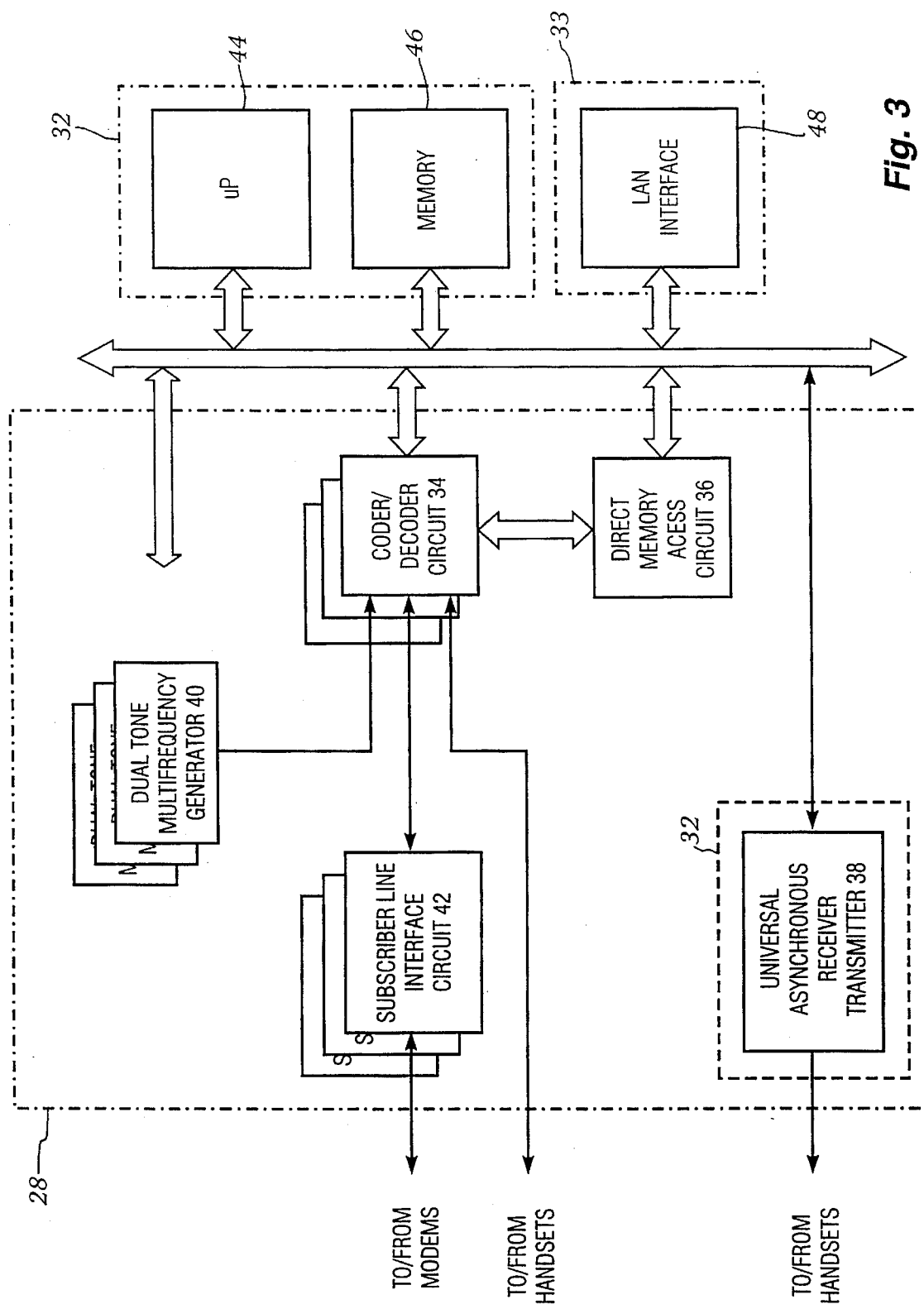
FIG. 3 is a block diagram representing the telecommunications circuitry disposed in a seat electronics box (SEB) in accordance with a preferred form of the present invention.

Turning now also to FIG. 3, in a preferred form a seat electronics box (SEB) telephone subsystem 14 in accordance with the present invention may comprise a seat box telephone board 28, which is coupled via a data bus 30, to a seat box microprocessor board 32 and a local area network (LAN) interface board 33. The seat box telephone board 28 comprises a coder/decoder (CODEC) circuit 34, for example, part no. CS4231 manufactured by Crystal Semiconductor of Austin, Tex.; a direct memory access controller (DMAC) 36, for example, part no. 82C206 manufactured by Chips and Technology, Inc., of San Jose, Calif.; a dual tone multifrequency generator (DTMF) circuit, 40, for example, part no. TP5088 manufactured by National Semiconductor of Santa Clara, Calif.; and a subscriber line interface circuit (SLIC) 42, for example, part no. HC-5524 manufactured by Harris Semiconductor of Melbourne, Fla. The seat box microprocessor board 32 comprises a microprocessor 44, for example, part no. MC68340 manufactured by Motorolla, Inc. of Phoenix, Ariz.; a universal asynchronous receiver-transmitter circuit (UART) 38, for example, part no. SCC26988 manufactured by Signetics, Inc. of Sunnyvale, Calif.; and a memory circuit 46 (preferably a dual port random access memory). The LAN interface board 33 comprises a token ring local area network (LAN) interface circuit 48, for example, part no. TMS 380 manufactured by Texas Instruments, Inc., of Dallas, Tex. Because the operation of the above-described circuits is well known in the art, only a summary description of the function of the above-described circuits within the telephone system 10 of the present invention is provided below.

Once a passenger activates a handset 12 by, for example, removing the handset 12 from an associated mount (not shown), the handset 12 will provide to the microprocessor 44 via the universal asynchronous receiver-transmitter circuit 38 an "off-hook" message. In response to this message, the microprocessor 44 will forward to the LAN interface circuit 48 via the bus 30 a message identifying the handset 12 and requesting that a channel on the CEPT E1 bus be made available for the call to be placed via the handset 12. This message is sent by the LAN interface circuit 48 to an area distribution box (ADB) telephone subsystem 16 and, from there, forwarded to the passenger entertainment system controller (PESC) telephone card 18. Upon being received by the passenger entertainment system controller (PESC) telephone card 18, the message is reformatted and forwarded over the CEPT E1 bus 24 to the cabin telecommunications unit (CTU) 20. In response to this message the cabin telecommunications unit (CTU) 20 will designate a channel on the CEPT E1 bus for transmission of the call to be made by the handset 12 and will forward back through the designated channel and the remainder of the system 10 a message identifying which CEPT E1 channel will be made available for the call. The CTU 20 will also forward back through the system a "credit card prompt" instructing the user of the handset 12 to enter his or her credit card data by, for example, running the user's credit card through a magnetic strip reader disposed in the handset 12. The user's credit card information is provided by the handset 12 to the microprocessor 44 via the universal synchronous receiver-transmitter (UART) circuit 12 and, then, forwarded through the system 10 to the cabin telecommunications unit (CTU) 20 in the manner described above. If the user's credit card is approved by the cabin telecommunications unit (CTU) 20, a message comprising a "dial prompt" (i.e. a prompt to enter a desired number and depress the "send" key) is sent by the CTU 20 back through the system 10 to the handset 12. Upon receipt of a dial tone at the handset 12, the user may enter a number to be called and depress the "send" key (not shown) of the handset 12 and, in doing so, cause a digital message representing the desired number to be forwarded from the handset 12 to the microprocessor 44 via the universal asynchronous receiver-transmitter (UART) circuit 12. The digital representation of the number to be called will then be forwarded through the system 10 in the manner described above to the cabin telecommunications unit (CTU) 20 and the CTU will initiate the call via the satellite data communications unit (SATCOM) 22.

Once a call is established, analog voice data provided by the handset 12 to the seat electronics box (SEB) telephone board 28 is processed in the following manner. The analog voice signal generated by the handset 12 is provided to the coder/decoder circuit (CODEC) 34, which comprises a digital-to-analog D/A and analog-to-digital A/D converter with dynamic A-Law compression. The CODEC 34, in turn, converts the analog voice signal to a pulse code modulated (PCM) digital data signal with A-Law encoding and, under the control of the direct memory access controller (DMAC) 36, delivers the converted PCM digital data signal via the bus 30 to the memory 46. As the PCM digital data signal is stored in the memory 46, it is broken into a plurality of data packets, each of which comprises 128 bytes of PCM digital voice data. Those skilled in the art will appreciate that the preferred size of the packets may vary from system to system. For example, the packet size might be set to 256 bytes or 64 bytes depending on the operating characteristics of a given system. Once a complete packet of PCM digital voice data is collected in the memory 46, that packet is transferred under the control of the direct memory access controller (DMAC) 36 and the microprocessor 44 via the bus 30 to the LAN interface circuit 48. During this process the microprocessor 44 adds a header to the beginning of the PCM digital data packet and an identification byte to the end of the packet. The header defines the address within the token ring LAN $TR_{O-N}$ to which the PCM digital data packet is to be sent, and the identification byte identifies which handset 12 transmitted the packet and within which channel of the CEPT E1 bus the packet will be transmitted.

Upon receiving the packet, header and identification bytes from the memory 46, the LAN interface circuit 48 forwards the packet, header and identification bytes to the appropriate address within the token ring LAN $TR_{A-N}$. Generally, any packets which are transmitted over the token ring LANs by the seat electronics box (SEB) Subsystems 14 will be addressed to the area distribution box (ADB) subsystem 16 which is coupled to the relevant seat electronics box (SEB) daisy chain. However, this need not be the case in all instances, as the data packets might just as easily be sent to other seat electronics box (SEB) locations on the relevant daisy chain or to other seat electronics box (SEB) locations within the system 10.

In a preferred form, the token ring local area networks (LANs) $TR_{O-N}$ function in accordance with industry standard IEEE 802.5 protocol, and the various LAN interface circuits 48, 54, 56 and 58 are connected to one another by two 100 Ohm twisted pair conductors, i.e. data buses DATA 1 and DATA 2. Further, in a preferred form only the DATA 1 bus is used for message transmission. Thus, if a message is to be delivered from the first seat electronics box (SEB) subsystem $14_A$ to an associated area distribution box (ADB) subsystem $16_A$, the message will be passed down the daisy chain on the DATA 1 bus to the last seat electronics box (SEB) subsystem $16_N$ in the daisy chain and, then, passed up the DATA 2 bus (passing through each intervening seat electronics box (SEB) subsystem 14) to the area distribution box (ADB) subsystem 16. Communications between the passenger entertainment system controller (PESC) telephone card 18 and the various area distribution box (ADB) subsystems 16 proceed in a similar fashion.

Those skilled in the art will appreciate that just as the handsets 12 may provide analog audio signals to the CODEC 34, so also may the dual tone multifrequency generator (DTMF) circuit 40 and the subscriber line interface circuit (SLIC) 42. Moreover, the DTMF may, at the instruction of the microprocessor 44, be used to generate tones when the numbered keys (not shown) of the handset 12 are depressed, and the SLIC may comprise a two-to-four wire facsimile interface and may be used to provide the analog tone signals generated by a facsimile modem to the CODEC 34. The transmission of either of these types of signals over the system 10 proceeds in the same fashion as that described above.

ADB Telephone Subsystem

Figure 4:
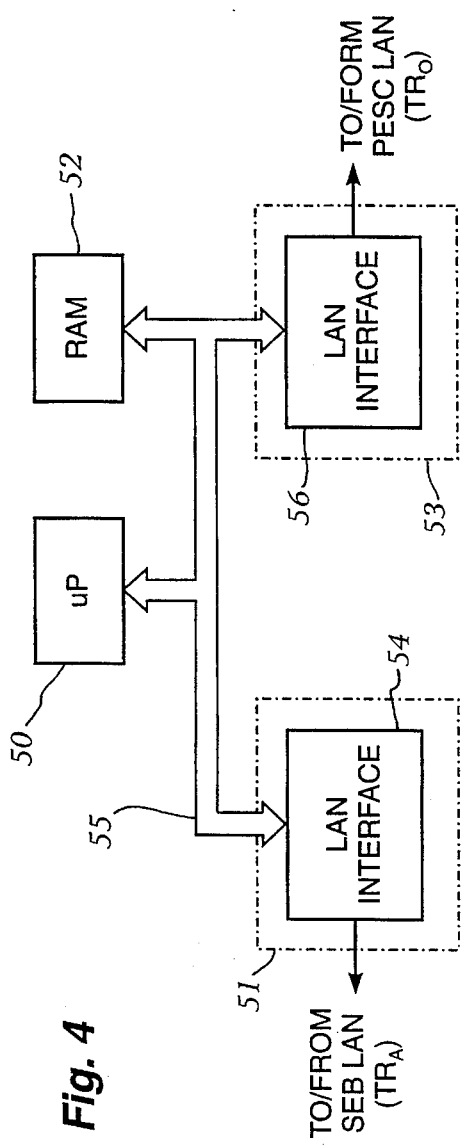
FIG. 4 is a block diagram representing the telecommunications routing subsystem which may be disposed in an area distribution box (ADB) in accordance with a preferred form of the present invention.

Turning now also to FIG. 4, each area distribution box (ADB) subsystem 16 may comprise a microprocessor board 49 having mounted thereon a microprocessor 50 (for example, part No. MC68340 manufactured by Motorolla, Inc.) and a memory 52 (preferably RAM); and two LAN boards 51 and 53, each having a LAN interface circuit (for example, part no. TMS 380 manufactured by Texas Instruments, Inc:, of Dallas, Tex.) 54 or 56 disposed thereon. The components disposed on the microprocessor board 49 and the components disposed on the two LAN boards 51 and 53 are interconnected via a data bus 55.

In a preferred form, one of the LAN interface circuits 54 is coupled to a seat electronics box (SEB) token ring LAN $TR_{A-N}$, and one of the LAN interface circuits 56 may comprise a node in token ring LAN $TR_O$ which links each area distribution box (ADB) subsystem 16 to the passenger entertainment system controller (PESC) telephone board 18.

The primary function of the area distribution box (ADB) subsystem 16 is to provide system routing between and among the seat electronics box (SEB) subsystems 14, the area distribution box (ADB) subsystems 16, and the passenger entertainment system controller (PESC) telephone card 18. More specifically, as data packets transmitted from the seat electronics box (SEB) subsystems 14 are received by the LAN interface circuit 54 those data packets are forwarded to, and stored in, the memory 52 under the control of the microprocessor 50. Next, the data packets are retrieved from the memory 52 and provided to the LAN interface circuit 56 for transmission to the passenger entertainment system controller (PESC) telephone board.

It may be noted that the addresses headers, which are appended to the data packets transmitted to the area distribution box (ADB) telephone cards 16 from the seat electronics box (SEB) subsystems 14, comprise both a physical address layer and an internet protocol address layer. When data packets to be delivered to the passenger entertainment system controller (PESC) telephone card 18 are received by an area distribution box (ADB) subsystem 16 and forwarded to the passenger entertainment system controller (PESC) telephone card 18, the physical address layer is removed from the header and replaced with a layer identifying the physical address of the passenger entertainment system controller (PESC) telephone card 18.

PESC Telephone Card

Figure 5:
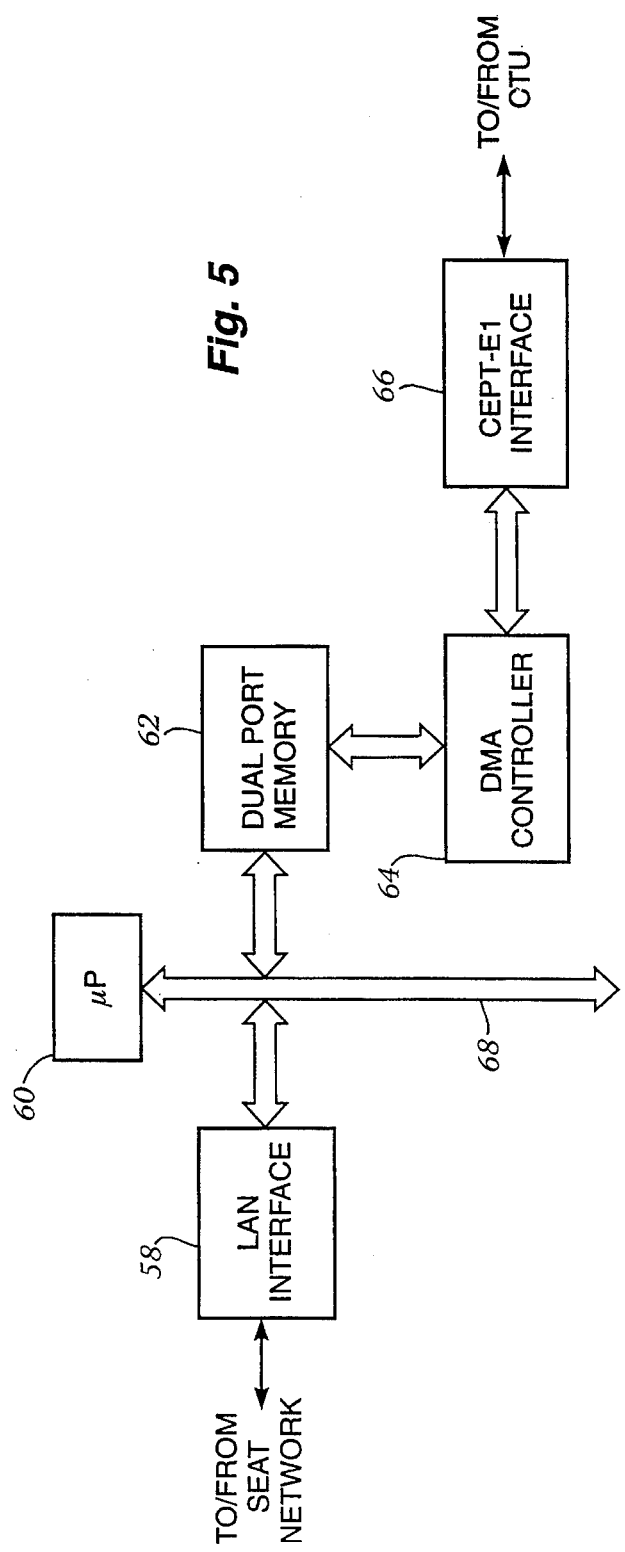
FIG. 5 is a block diagram representing the telecommunications circuitry disposed in a passenger entertainment system controller in accordance with a preferred form of the present invention.

Turning now to FIG. 5, in a preferred form the passenger entertainment system controller (PESC) telephone card 18 may comprise a token ring LAN interface circuit 58 (for example, part no. TMS 380 manufactured by Texas Instruments, Inc., of Dallas, Tex.), a microprocessors 60 (for example, part no. MC68EC020 manufactured by Motorola, Inc. of Phoenix, Ariz.), a dual port memory 62, a direct memory access controller (DMAC) 64 (for example, part no. Bt8071 manufactured by Brooktree, Inc., of San Diego, Calif.), a CEPT E1 interface circuit 66 (for example, part nos. Bt8510 and Bt8069 manufactured by Brooktree, Inc. of San Diego, Calif.), and a data bus 68.

The primary function of the passenger entertainment system controller (PESC) telephone card is to provide a communications link between the seat electronics box (SEB) telephone subsystems 14 (i.e. the SEB and/or ADB token ring LANs $TR_{O-N}$) and the cabin telecommunications unit (CTU) 20 (i.e. the CEPT E1 bus 24). The function of this communications link may be summarized as follows. As data packets are received by the token ring LAN interface 58, the data packets are delivered to, and stored in, the dual port memory 62. The data packets are then retrieved from the dual port memory 62, reformatted in accordance with CEPT E1 protocol (i.e. the headers and identification bytes are removed from the packets), and delivered to the CEPT E1 interface circuit 66 under the control of the microprocessor 60. Similarly, as data frames are received by the CEPT E1 interface circuit 66, data from the frames are delivered to, and stored in, the dual port memory 62. During this process, the data packets are reformatted (i.e. headers and identification bytes are added) in accordance with IEEE 802.5 protocol. Then, the data packets are retrieved from the dual pore memory 62 and delivered to the token ring LAN interface circuit 58.

As explained in part in the preceding sections, data communications over the token ring local area networks (LANs) $TR_{O-N}$ meet IEEE 802.5 token ring standards. The token ring data transmission rate is preferably set at 16 Mbps, and the token ring interface circuits are preferably interconnected via two 100 ohm shielded twisted pair conductors (i.e. the DATA 1 and DATA 2 buses). Further, data communications between the passenger entertainment system controller (PESC) telephone card 18 and the cabin telecommunications unit (CTU) 20 are provided by the CEPT E1 bus 24. The CEPT E1 bus 24 meets CCITT standards per documents G.703, Section 6; G.704, Section 2.3; and G.732, Sections 1–7. The CEPT E1 transmission rate is preferably 2.048 Mbps, and the CEPT E1 transmissions are provided over two 120 Ohm shielded twisted pair conductors.

Cabin Telecommunications Unit

The structure and function of the cabin telecommunications unit (CTU) 20 is well known in the art and will not be explained in detail herein. Moreover, the CTU 20 functions in accordance with ARINC specification 746, and may be purchased from either Matsushita Electronics Industrial Co., Ltd., of Osaka, Japan (model no. RD-AT1003), or Claircom Communications, Inc., of Seattle, Wash.

Satellite Data Communications Unit Subsystem

Like the cabin telecommunications unit (CTU) 20, the structure and function of the satellite data communications unit (SATCOM) 22 is well known in the art and, therefore, will not be discussed in detail herein. The SATCOM 22 may be purchased, for example, from Honeywell, Inc. of Minneapolis, Minn., and its function is also defined by ARINC specifications.

An Alternative System Configuration

Figure 6:
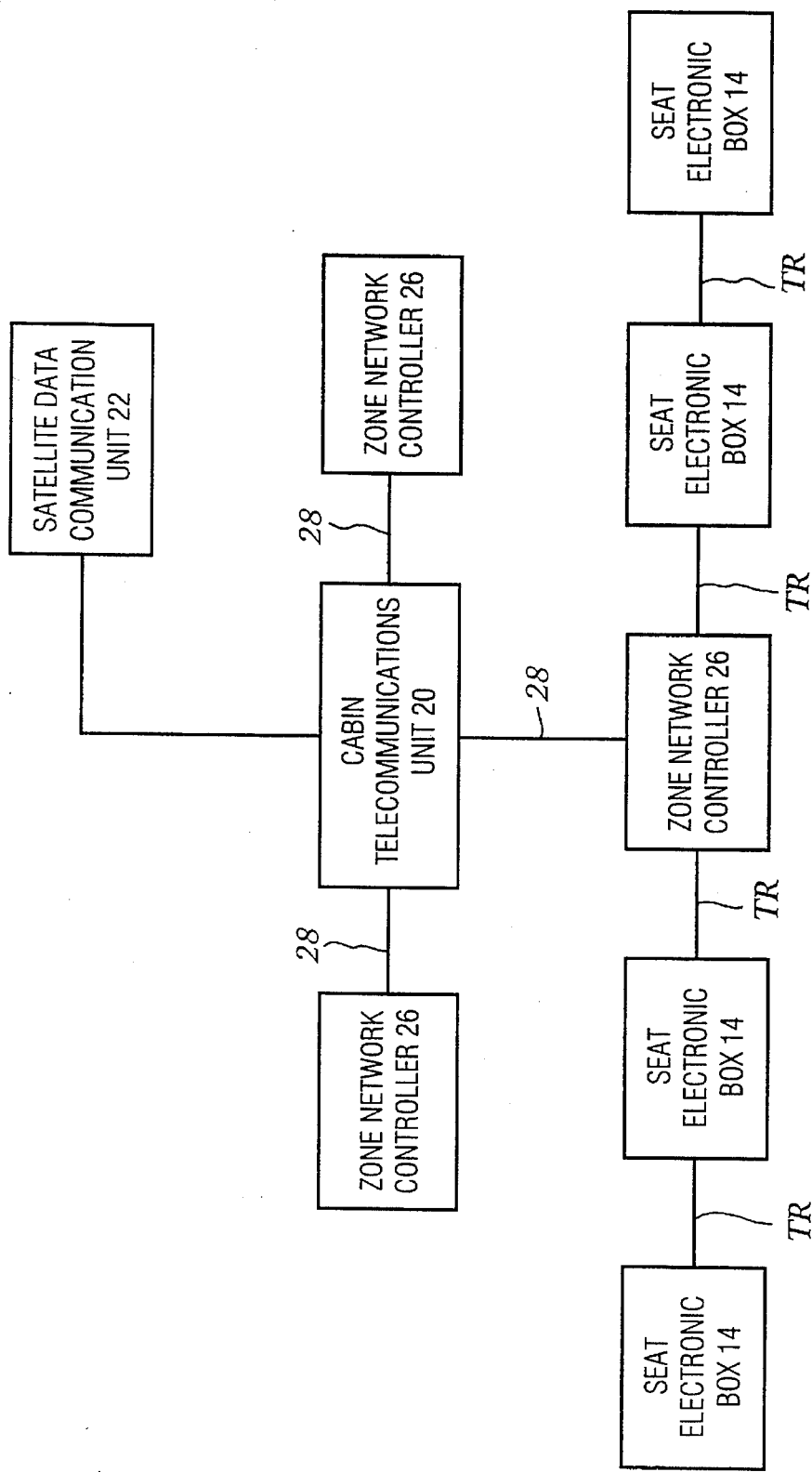
FIG. 6 is a block diagram representing an aircraft telecommunications system in accordance with another preferred form of the present invention.

Turning now to FIG. 6, in an alternative embodiment a telecommunications system 10 in accordance with the present invention may be configured in such a fashion that the cabin telecommunications unit (CTU) may be linked directly to each of a plurality of zone network: controller (ZNC) telephone cards 26 via separate CEPT E1 buses 28, and the seat electronics box (SEB) telephone subsystems 14 may be connected in, for example, one or more daisy chains over a token ring local area network (LAN) TR to the zone network controller (ZNC) telephone cards 26. In such an embodiment, the zone network controller (ZNC) cards 26 would comprise the same elements and the passenger entertainment system controller (PESC) telephone cards 18 described above and would function in essentially the same manner.

While the invention is susceptible to various modifications and alternative forms, specific examples thereof have been shown in the drawings and are herein described in detail. It should be understood, however, that it is not intended to limit the invention to the particular forms disclosed, but on the contrary, the invention is to cover all modifications, equivalents, and alternatives falling within the spirit and scope of the invention as defined by the appended claims.

What is claimed is:

1. A method for distributing telecommunications voice data within an aircraft or other vehicle, said method comprising the steps of:

generating an analog audio voice signal;

converting said analog audio voice signal to a digital data signal;

separating said digital data signal into a plurality of bytes of digital audio data and storing said digital audio data bytes in a first memory;

retrieving sets of said digital audio data bytes from said first memory and delivering Said sets of said digital audio data bytes to a first local area network;

transmitting said sets of said digital audio data bytes over said first local area network to a first telephone data routing circuit;

storing said sets of said digital audio data bytes in a second memory electronically coupled to said first telephone data routing circuit;

retrieving said sets of said digital audio data bytes from said second memory and delivering said sets of said digital audio data bytes to a second local area network;

transmitting said sets of said digital audio data bytes over said second local area network to a second telephone data routing circuit;

storing said sets of said digital audio data bytes in a third memory electronically coupled to said second telephone data routing circuit;

retrieving said sets of said digital audio data bytes from said third memory, formatting said sets of digital audio data bytes for transmission over a serial data communications bus; and delivering said sets of said digital audio data bytes to said serial data communications bus for transmission to a cabin telecommunications unit.

2. The method of claim 5 wherein said first and second local area networks comprise token ring local area networks and operate accordance with IEEE standard 802.5 protocol, and wherein said serial data communications bus comprises a CEPT E1 bus.

3. A method for distributing telecommunications voice data within an aircraft or other vehicle, said method comprising the steps of:

generating an analog audio voice signal;

converting said analog audio voice signal to a digital data signal;

separating said digital data signal into bytes of digital audio data and storing said bytes of digital audio data in a first memory;

retrieving sets of said digital audio data bytes from said first memory and delivering said sets of said digital audio data bytes to a local area network;

transmitting said sets of said digital audio data bytes over said local area network to a telephone data routing circuit;

storing said sets of said digital audio data bytes in a second memory electronically coupled to said telephone data routing circuit;

retrieving said sets of said digital audio data bytes from said second memory, formatting said sets of digital audio data bytes for transmission over a serial data communications bus; and delivering said sets of said digital audio data bytes to said serial data communications bus for transmission to a cabin telecommunications unit.

4. The method of claim 3 wherein said local area network is a token ring local area network and operates in accordance with IEEE standard 802.5 protocol, and wherein said serial data communications bus is a CEPT E1 bus.

* * * * *

UNITED STATES PATENT AND TRADEMARK OFFICE
CERTIFICATE OF CORRECTION

PATENT NO. : 5,568,484
DATED : October 22, 1996
INVENTOR(S) : Paul A. Margis

It is certified that error appears in the above-identified patent and that said Letters Patent is hereby corrected as shown below:

In Column 9, line 7, please change "Said" to – said –.

In Column 9, line 33, please change "claim 5" to – claim 1 –.

Signed and Sealed this

Fifteenth Day of June, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,568,484
DATED : October 22, 1996
INVENTOR(S) : Paul A. Margis

It is certified that error appears in the above-identified patent and that said Letters Patent is hereby corrected as shown below:

Column 4, line 16, please change "reformat:ted" to -- reformatted --.

Column 4, line 24, please change "preferred for" to -- preferred form --.

Column 7, line 43, please change "microprocessors" to -- microprocessor --.

Signed and Sealed this

First Day of February, 2000

*Attest:*

*Attesting Officer*

Q. TODD DICKINSON

*Acting Commissioner of Patents and Trademarks*